United States Patent
Choi et al.

(10) Patent No.: US 8,628,664 B2
(45) Date of Patent: Jan. 14, 2014

(54) PURIFICATION SYSTEM HAVING VERTICAL MULTICOMPARTMENT REACTOR FOR ORGANIC WASTE WATER

(75) Inventors: Hong Lim Choi, Seoul (KR); Jeong Mun Lim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 413 days.

(21) Appl. No.: 13/116,742

(22) Filed: May 26, 2011

(65) Prior Publication Data

US 2012/0168362 A1    Jul. 5, 2012

(30) Foreign Application Priority Data

Dec. 31, 2010   (KR) .................. 10-2010-0140170

(51) Int. Cl.
*C02F 1/00* (2006.01)
(52) U.S. Cl.
USPC .......................................................... 210/256
(58) Field of Classification Search
USPC ................... 210/252, 256, 512.1, 220
See application file for complete search history.

(56) References Cited

U.S. PATENT DOCUMENTS

| | | | | |
|---|---|---|---|---|
| 2,889,929 A | * | 6/1959 | Kivell | 210/194 |
| 5,211,844 A | * | 5/1993 | Hattori et al. | 210/151 |
| 5,338,447 A | * | 8/1994 | Vellinga | 210/195.1 |
| 5,707,513 A | * | 1/1998 | Jowett et al. | 210/150 |
| 5,958,239 A | * | 9/1999 | Sing | 210/605 |
| 6,761,823 B2 | * | 7/2004 | Maddux et al. | 210/615 |

FOREIGN PATENT DOCUMENTS

| | | |
|---|---|---|
| KR | 10-0221850 B1 | 6/1999 |
| KR | 10-0358962 B1 | 10/2002 |
| KR | 10-0709456 B1 | 4/2007 |
| KR | 10-2009-0022168 A | 3/2009 |

OTHER PUBLICATIONS

English language Abstract of KR 10-0221850 B1 for Korean Publication of Application No. 10-1998-0067740 A.
English language Abstract of KR 10-0358962 B1 for Korean Publication of Application No. 10-1999-8-0083987 A.
English language Abstract of KR 10-0709456 B1.
English language Abstract of KR 10-2009-0022168 A.

* cited by examiner

*Primary Examiner* — Chester Barry
(74) *Attorney, Agent, or Firm* — Hershkovitz & Associates, PLLC; Abraham Hershkovitz

(57) ABSTRACT

Provided is an purification system having vertical multi-compartment reactor for organic waste water, which generates swirling flow in respective sections while circulating wastewater vertically in respective wastewater treatment blocks in the system, so as to considerably increase contact time between air and the wastewater, thus greatly improving wastewater treatment efficiency. According to the system, a size of an aeration tank built in the wastewater purification system may be greatly decreased.

2 Claims, 3 Drawing Sheets

PURIFICATION SYSTEM HAVING VERTICAL MULTICOMPARTMENT REACTOR FOR ORGANIC WASTE WATER

CROSS-REFERENCE TO RELATED APPLICATIONS

The present application claims priority to Korean Patent Application No. 10-2010-0140170, filed on Dec. 31, 2010, the disclosures of which is expressly incorporated by reference in its entireties.

BACKGROUND OF THE INVENTION

1. Field of the Invention

The present invention relates to an organic wastewater purification system capable of generating swirling flow (or vortex) in multiple vertical compartments of an aeration tank while circulating wastewater vertically in the tank and, more particularly, to a system for purification of organic wastewater that generates swirling flow in respective compartments while flowing the wastewater up and down and in a zig-zag pattern in respective wastewater treatment blocks in the system, so as to prolong contact time between air and the wastewater, in turn remarkably improving wastewater treatment efficiency and, as a result, enabling decrease in the size of an aeration tank.

2. Description of the Related Art

Most contaminants in sewage contain organic matter and nutrients consisting mainly of nitrogen and phosphorous. As such, a variety of attempts have been made to develop a wastewater purification system operating based upon removal of nitrogen and phosphorus.

Most conventional processes for removal of biological nitrogen, phosphorous, or the like are executed using different types of reactors, for example: an oxic reactor (commonly referred to as 'aeration tank') for nitrification and intake of excess phosphorous; an anoxic reactor for de-nitrification; an anaerobic reactor for discharging phosphorous, and so forth.

Such an aeration tank used for removal of biological nitrogen and/or phosphorous has functions of: applying microorganisms which consume organic carbon as nutrients to remove BOD and/or COD-related organic materials from raw wastewater; and allowing organic nitrogen and/or ammonia to undergo nitritation and then be oxidized into nitrate-nitrogen. For this purpose, air must be sufficiently fed to the wastewater in the aeration tank and the supplied air must be homogeneously mixed with the wastewater and microorganisms, to thereby improve oxygen permeation.

Therefore, the aeration tank described above is a reactor used to purify wastewater, sewage, livestock sludge, etc., and is commonly equipped with an air diffuser at a lower portion thereof, in order to pass high oxygen concentration air through contaminants in the wastewater, thus promoting degradation of the contaminants by microorganisms and purification of the wastewater.

However, purification of highly concentrated wastewater entails a problem of decreased oxygen transfer rate to contaminants in the wastewater and, in order to solve this problem, various attempts such as increase in aeration tank capacity, additional provision of an air diffuser, use of an air diffuser to generate micro-bubbles, and so forth, have been conducted.

However, the foregoing methods to overcome decrease in oxygen transfer rate to contaminants in wastewater have been faced with tasks of increasing aeration tank capacity and/or content of dissolved oxygen in the wastewater, in turn entailing economic problems such as land acquisition costs, construction costs, energy consumption, and so forth.

Most apparatuses for purification of wastewater in the prior art have adopted a box type aeration tank equipped with an air diffuser at a lower part thereof, in which air flowing through the air diffuser is mixed with wastewater to accelerate degradation of contaminants by microorganisms, as described in Korean Laid-Open Patent Publication No. 2009-22168 (entitled "Method for treatment of livestock wastewater and apparatus therefor"), Korean Patent Publication No. 10-0709456 (entitled "Apparatus and method for treatment of wastewater treatment"), Korean Laid-Open Patent Publication No. 1998-67740 (entitled "method and apparatus for removal of nutrients in treatment of sewage and wastewater"), or the like. However, since the box type aeration tank used in such a wastewater treatment apparatus described above generally has a single structure that is not divided into multiple blocks or sections, wastewater may directly pass through the aeration tank and contact time between the wastewater and air is very short, in turn deteriorating degradation capability of contaminants in the wastewater.

Intensive and extensive studies have been conducted to solve the foregoing problem, for example; Korean Laid-Open Patent Publication No. 1999-83987, entitled "Apparatus for treatment of sewage wastewater using U shaped aeration tank," discloses an apparatus having a 'U' shaped aeration tank to treat sewage wastewater, so as to increase contact time between wastewater and air. However, this U shaped aeration tank still has a single structure without compartmental blocks or sections, so that the wastewater directly passes through the aeration tank and the contact time between the wastewater and air is too short, thus entailing a problem of decreased contaminant degradation capability.

SUMMARY OF THE INVENTION

Therefore, the present invention has been made in view of the above problems, and it is one object of the present invention to provide a purification system having vertical multicompartment reactor for organic waste water. (hereinafter, referred to as 'vertical multi-compartments'), which generates swirling flow in respective sections while circulating wastewater vertically in respective wastewater treatment blocks in the system, so as to considerably increase contact time between air and the wastewater, thus greatly improving wastewater treatment efficiency. As a result, a size of an aeration tank built in the wastewater purification system may be greatly decreased.

In accordance with an aspect of the present invention, the purification system having vertical multicompartment reactor for organic waste water, the system comprising an aeration tank in which wastewater is purified using microorganisms and being characterized in that:

the aeration tank is divided into multiple wastewater treatment blocks by at least two vertical compartments;

each of the wastewater treatment blocks is divided into multiple sections, in which swirling flow is generated, by a plurality of parallel compartments;

a water inlet/outlet is provided on one end of each parallel compartment which divides the swirling flow generating sections; and a swirling flow induction plate is placed under the water inlet/outlet and is inclined at a predetermined angle or curved into a round form to induce swirling flow of the wastewater.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention describes a purification system having vertical multicompartment reactor for organic waste water, that has an aeration tank divided into multiple sections in which swirling flow is generated, and allows the wastewater to be swirled and retained in each of these sections, thus considerably increasing contact time between air and the wastewater.

Hereinafter, the purification system having vertical multicompartment reactor for organic waste water according to the present invention will be described with reference to the annexed drawings in more detail.

Figure 1:
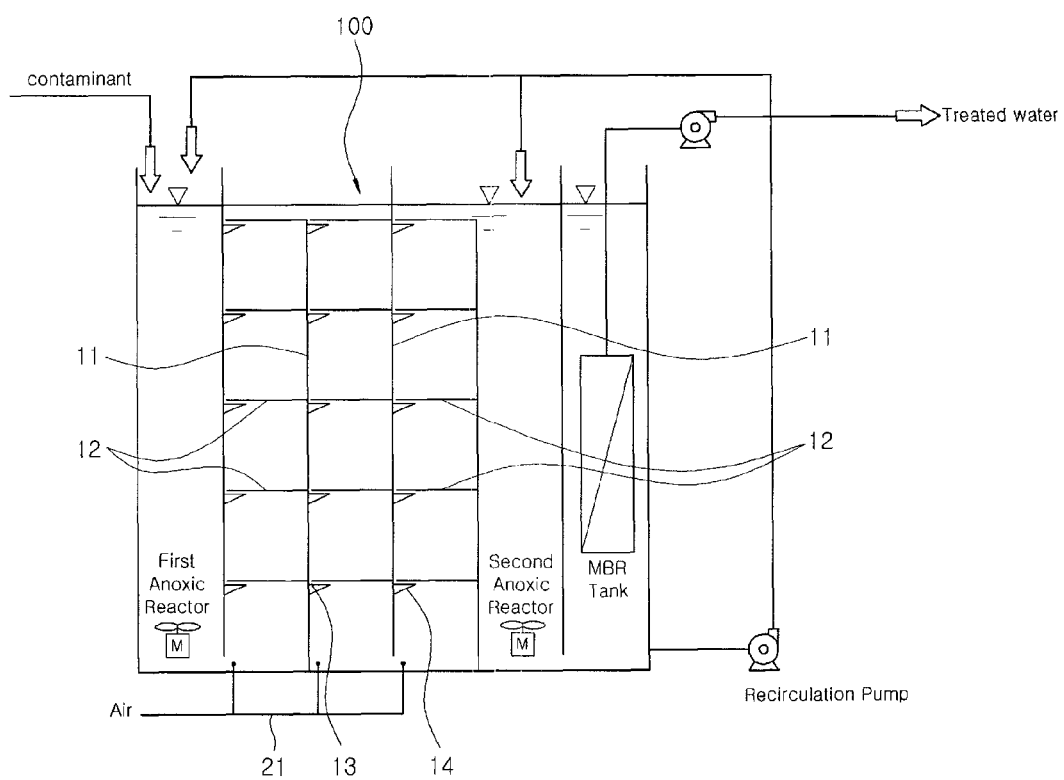
FIG. 1 shows the overall construction of a wastewater purification system according to an embodiment of the present invention.
Figure 2:
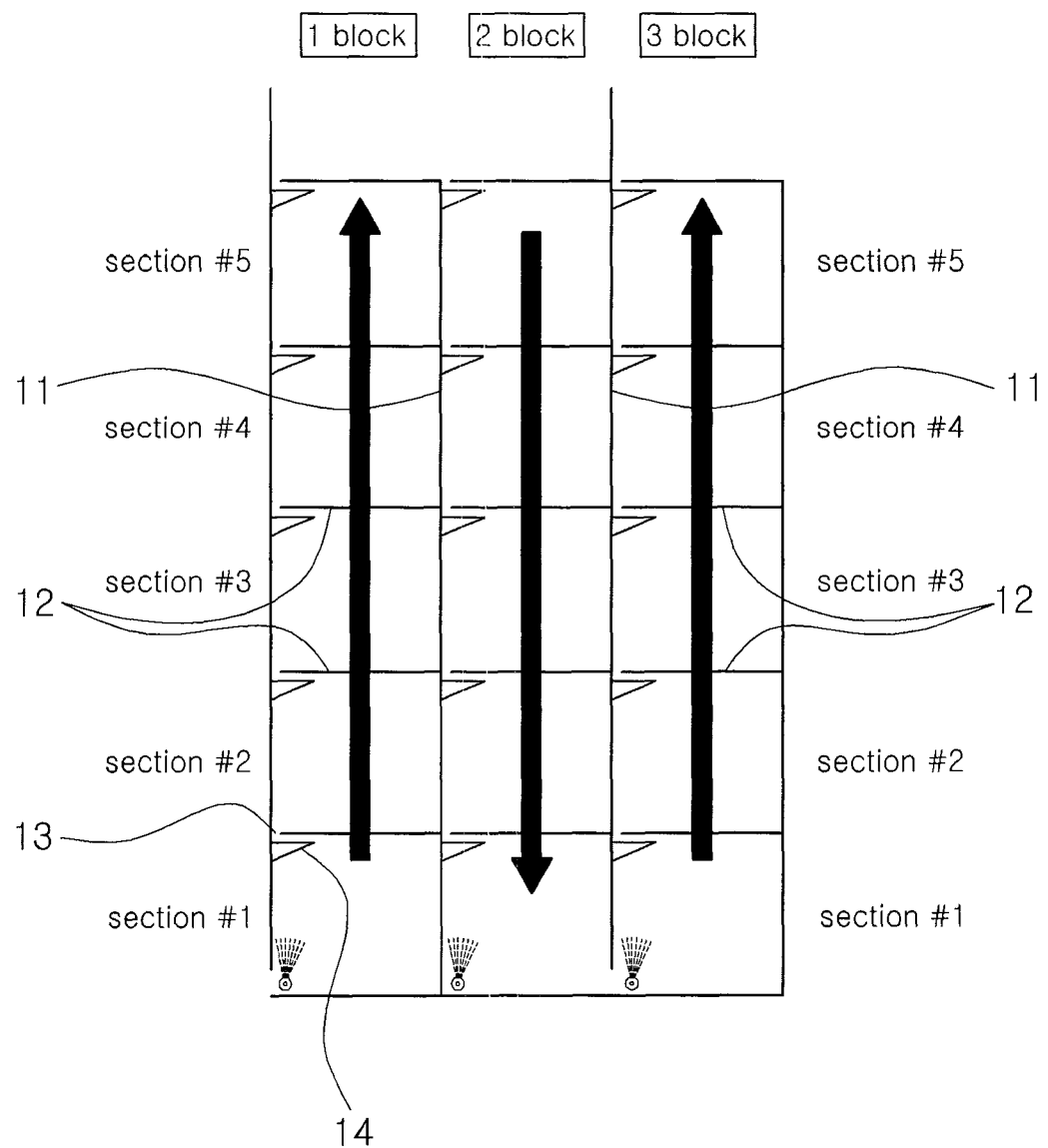
FIG. 2 is a front cross-sectional view illustrating an aeration tank built in a wastewater purification system according to an embodiment of the present invention.

FIG. 1 schematically illustrates the overall construction of a wastewater purification system according to an embodiment of the present invention. FIG. 2 is a front cross-sectional view illustrating an aeration tank built in a wastewater purification system according to an embodiment of the present invention. In addition, FIG. 3 shows swirling flow generated in a section of the aeration tank built in the wastewater purification system shown in FIG. 2.

Figure 3:
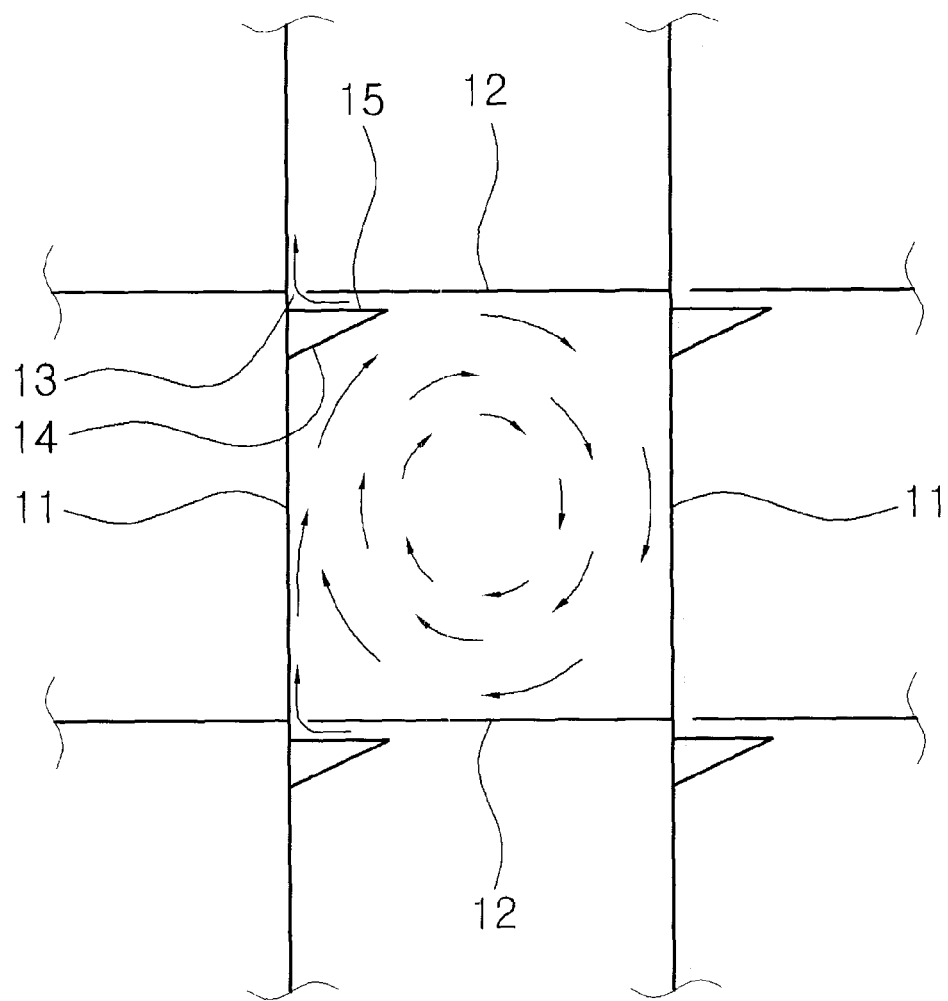
FIG. 3 illustrates swirling flow generated in a section of the aeration tank built in the wastewater purification system shown in FIG. 2.

Referring to FIGS. 1 to 3, the wastewater purification system according to an embodiment of the present invention comprises an aeration tank 100 which is placed between a first anoxic reactor and a second anoxic reactor, and is connected to an air diffuser at a lower part thereof. At least two vertical compartments 11 are formed inside the aeration tank 100, thus dividing the inner space of the aeration tank 100 into multiple blocks for wastewater treatment (hereinafter, referred to as 'wastewater treatment blocks').

Since the aeration tank 100 is divided into multiple blocks by the vertical compartments 11, water present in a given wastewater treatment block is not mixed with water present in adjacent blocks. Water present in a wastewater treatment block may flow up and over a top end of the vertical compartment 11, and then, move toward adjacent wastewater treatment blocks. Otherwise, the water may flow down and pass through a wastewater inlet at a bottom of the vertical compartment 11, and then, move toward adjacent wastewater treatment blocks. For instance, as shown in FIG. 2, the inventive aeration tank may have a specific construction in that; wastewater fed from a first anoxic reactor through a wastewater inlet at one bottom end of the aeration tank 100 flows up in a vertical direction along a first wastewater treatment block, overflows into a second wastewater treatment block, flows down along the second wastewater treatment block, passes through a wastewater inlet at one bottom end of the vertical compartment 11, flows inside a third wastewater treatment block, flows up along the third wastewater treatment block, and finally overflows into a second anoxic reactor.

As described above, since the interior of the aeration tank 100 is divided into multiple blocks by vertical compartments 11 and the wastewater flows up and down and in a zig-zag pattern along respective wastewater blocks of the aeration tank 100, contact time between the wastewater and air fed through the air diffuser 21 may be prolonged to remarkably enhance oxygen transfer rate to contaminants in the wastewater, as compared to conventional aeration tanks.

In addition, in order to further increase the contact time between the wastewater and air, a plurality of parallel compartments 12 may be provided at predetermined up-and-down intervals to each of the wastewater treatment blocks in the aeration tank 100. Owing to such parallel compartments 12, each wastewater block may be divided into multiple sections in which swirling flow is generated (hereinafter, referred to as "swirling flow section").

Since the wastewater treatment blocks are divided into multiple swirling flow sections by the parallel compartments 12, the wastewater may be swirled and retained in each of the sections for a predetermined time, and then, gradually flow up and down along the wastewater treatment blocks. While the wastewater is swirled and retained in each swirling flow section for a predetermined time, contact time between the wastewater and air and contact efficiency may be considerably increased, thereby effectively improving oxygen transfer rate to contaminants in the wastewater.

In order to slowly flow the wastewater along the wastewater treatment blocks while swirling and retaining the wastewater in respective swirling flow sections, a water inlet/outlet 13 may be provided at one end of each parallel compartment.

When the wastewater inflowing a swirling flow section through a water inlet/outlet 13 of a given parallel compartment is swirled and retained for a predetermined time, contaminants in the retained wastewater may effectively contact air for a prolonged period of time. If the wastewater swirled in the swirling flow section partially outflows through a water inlet/outlet 13 of another parallel compartment, an amount of such wastewater outflow may be supplemented with wastewater fed through the water inlet/outlet of the given parallel compartment described above. Therefore, the swirling flow section may always contain a constant amount of wastewater and the wastewater may be swirled and retained therein for a predetermined time. Consequently, the wastewater may be swirled and retained in respective swirling flow sections for a predetermined time, and then, slowly flow up and down along respective wastewater treatment blocks.

Moreover, in order to induce swirling flow of the wastewater in each of the swirling flow sections, a swirling flow induction plate 14 may be placed under a water inlet/outlet of each parallel compartment.

The swirling flow induction plate 14 is placed under the water inlet/outlet 13 of each parallel compartment and supported by a supporter 15 may induce swirling flow of the wastewater flowing into a given swirling flow section and allow the same to be retained therein for a predetermined time. In this regard, the wastewater generating the swirling flow partially passes through the water inlet/outlet 13 of the parallel compartment and flows up and down, in turn overflowing into adjacent swirling flow sections.

The swirling flow induction plate 14 formed under the water inlet/outlet of each parallel compartment may be inclined at a predetermined angle or be curved to form a round shape, in order to effectively induce swirling flow.

Since the swirling flow induction plate 14 formed under the waster inlet/out of each parallel compartment induces swirling flow of the wastewater fed into a given swirling flow section and allows the same to be retained therein for a predetermined time, contaminants in the wastewater retained in the section may effectively contact air for a prolonged period of time to thereby considerably increase oxygen transfer rate to the contaminants in the wastewater.

The purification system having vertical multi-compartment reactor for organic waste water, as described above, may generate swirling flow in respective swirling flow sections while circulating the wastewater vertically in respective wastewater treatment blocks, so as to considerably increase contact time between the wastewater and air, to thereby effectively improve wastewater treatment efficiency.

Furthermore, since the wastewater treatment efficiency is greatly improved by swirling flow generated in each of the swirling flow sections, the present invention may attain various advantages such as considerable decrease in size of an aeration tank, a simple structure, easy construction and/or installation, in turn greatly decreasing land acquisition costs, construction costs, etc.

As apparent from the foregoing, a purification system having vertical multicompartment reactor for organic waste water according to the present invention, may generate swirling flow in respective sections while flowing wastewater up and down and in a zig-zag pattern in respective wastewater treatment blocks in the system, so as to considerably increase contact time between the wastewater and air, thereby effectively improving wastewater treatment efficiency.

Moreover, the purification system having vertical multi-compartment reactor for organic waste water according to the present invention may enable decrease in size of an aeration tank, and has other advantages such as a simple structure, easy construction and/or installation, in turn greatly decreasing land acquisition costs, construction costs, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A purification system having vertical multi-compartment reactor for organic waste water, the system comprising an aeration tank in which wastewater is purified using microorganisms and being characterized in that:
   the aeration tank is divided into multiple wastewater treatment blocks by at least two vertical compartments;
   each of the wastewater treatment blocks is divided into multiple sections, in which swirling flow is generated, by a plurality of parallel compartments;
   a water inlet/outlet is provided on one end of each parallel compartment which divides the swirling flow generating sections; and
   a swirling flow induction plate is placed under the water inlet/outlet and is inclined at a predetermined angle or curved into a round form to induce swirling flow of the wastewater.

2. The system according to claim 1, wherein water present in a given wastewater treatment block formed in the aeration tank flows up and over a top end of the vertical compartment, and then, moves toward adjacent wastewater treatment blocks; or, otherwise, the water flows down and passes through a wastewater inlet at a bottom of the vertical compartment, and then, moves toward adjacent wastewater treatment blocks.

* * * * *